United States Patent [19]

Sakurai et al.

[11] Patent Number: 4,795,420

[45] Date of Patent: Jan. 3, 1989

[54] EXHAUST GAS CONTROL MEANS FOR ENGINE

[75] Inventors: Tadashi Sakurai; Wataru Fuchigami; Hideaki Kitta, all of Iwata, Japan

[73] Assignee: Yamaha Hatsudoki Kabushiki Kaisha, Iwata, Japan

[21] Appl. No.: 22,732

[22] Filed: Mar. 6, 1987

[30] Foreign Application Priority Data

Mar. 7, 1986 [JP] Japan ................................. 61-48489
Sep. 19, 1986 [JP] Japan ................................. 61-219702

[51] Int. Cl.$^4$ ............................................. F02B 27/02
[52] U.S. Cl. ................................. 60/313; 60/323; 60/324; 137/595; 180/219; 180/296; 180/309
[58] Field of Search ......................... 60/313, 324, 323; 180/219, 296, 309; 137/595

[56] References Cited

U.S. PATENT DOCUMENTS

| | | |
|---|---|---|
| 933,906 | 9/1909 | Illy . |
| 1,228,738 | 6/1917 | Barbarou ................ 137/595 |
| 1,411,226 | 3/1922 | Stumpf . |
| 2,230,740 | 2/1941 | Birkigt . |
| 2,239,262 | 4/1941 | Violet . |
| 2,305,946 | 12/1942 | Wilson et al. . |
| 2,627,851 | 2/1953 | Cushman . |
| 2,644,436 | 7/1953 | Berlyn . |
| 2,686,398 | 8/1954 | Anderson . |
| 2,717,583 | 9/1955 | Maybach et al. . |
| 3,523,418 | 8/1970 | Onishi . |
| 3,591,959 | 7/1971 | Marsee . |
| 3,670,844 | 6/1972 | Kubis ..................... 60/324 |
| 3,751,921 | 8/1973 | Penfold .................. 60/313 |
| 3,817,227 | 6/1974 | Blomberg et al. . |
| 3,938,330 | 2/1976 | Nakajima et al. . |
| 3,969,895 | 7/1976 | Krizman . |
| 4,051,821 | 10/1977 | Amann . |
| 4,254,752 | 3/1981 | Friddell et al. . |
| 4,427,087 | 1/1984 | Inoue ..................... 180/219 |
| 4,522,029 | 6/1985 | Tomita et al. . |
| 4,539,813 | 9/1985 | Tomita et al. . |
| 4,545,200 | 10/1985 | Oike et al. . |
| 4,554,785 | 11/1985 | Oike . |
| 4,558,566 | 12/1985 | Shirakura . |

FOREIGN PATENT DOCUMENTS

| | | | |
|---|---|---|---|
| 27316 | 7/1974 | Japan . | |
| 54118 | 5/1976 | Japan . | |
| 174719 | 12/1979 | Japan . | |
| 154539 | 11/1981 | Japan . | |
| 186013 | 11/1982 | Japan ..................... | 60/313 |
| 158311 | 9/1983 | Japan ..................... | 60/313 |
| 72925 | 5/1985 | Japan . | |
| 132018 | 7/1985 | Japan ..................... | 60/313 |
| 231156 | 9/1926 | United Kingdom . | |
| 262044 | 2/1928 | United Kingdom . | |
| 519806 | 4/1940 | United Kingdom . | |
| 542429 | 1/1942 | United Kingdom . | |
| 561932 | 1/1944 | United Kingdom . | |
| 572724 | 10/1945 | United Kingdom . | |

*Primary Examiner*—Douglas Hart
*Attorney, Agent, or Firm*—Ernest A. Beutler

[57] ABSTRACT

An improved valve for use in an exhaust system to increase the performance of the engine throughout the entire engine and load speed ranges by providing reflective areas that cooperate with the individual exhaust pipes of the engine to reduce pressure pulses in the combustion chamber during valve overlap periods. A number of embodiments of compact valve constructions are shown that employ relatively short journaling shafts for minimizing the effects of thermal expansion.

13 Claims, 8 Drawing Sheets

EXHAUST GAS CONTROL MEANS FOR ENGINE

BACKGROUND OF THE INVENTION

This invention relates to an exhaust gas control means for an engine and more particularly to an improved exhaust gas valve arrangement that improves the engine performance.

A well known expedient for increasing the output of an internal combustion engine is to employ large degrees of valve overlap so as to improve the breathing capacity of the engine at high speeds. However, as is well known, engines having high degrees of valve overlap tend to have poor low speed and mid range performance. It has been discovered that one reason for this poor mid range performance is the formation of pulses in the exhaust gases which tend to pass back into the combustion chamber during the period of valve overlap and cause the exhaust gases to flow outwardly through the intake passage thus precluding the induction of a proper fuel air mixture for smooth running.

As is disclosed in the copending patent applications of Hideaki Ueda, entitled "High Performance Exhaust Systems For Internal Combustion Engine", Ser. Nos. 935,340 and 935,342, filed Nov. 26, 1986, and assigned to the assignee of this application, it has been found that these poor mid range running conditions may be overcome through the use of a reflective valve that is disposed in the exhaust pipe between the exhaust ports and an expansion chamber. By appropriately positioning these reflective valves in response to the engine running characteristics, the effects of the exhaust pulses in causing reduced induction can be overcome and performance significantly improved.

In accordance with the arrangement shown in those patent applications, it is desirable to provide an individual reflective valve in each of the exhaust pipes of the engine. This, however, can cause certain problems in connection with design and operation. If individual operators are provided for each of the reflective exhaust valves, the system becomes very complicated and placement of all of the associated components can be difficult. However, if all of the valves are affixed for rotation with a common valve shaft, there are a number of other disadvantages which can arise. Because of the fact that the valve shaft passes through the exhaust pipes, expansion can become a problem. Furthermore, the longer the shaft becomes, the greater the expansion problems are.

It is, therefore, a principal object of this invention to provide an improved exhaust gas control means for an engine.

It is a further object of this invention to provide a multiple exhaust gas control valve arrangement wherein a plurality of flow paths can be controlled by individual valves while at the same time maintaining a compact configuration and a relatively short supporting shaft.

SUMMARY OF THE INVENTION

This invention is adapted to be embodied in a valve for controlling the flow of exhaust gases simultaneously through a plurality of exhaust pipes. The valve comprises a valve body that is adapted to be affixed to the exhaust pipes for receiving the exhaust gases therefrom and which defines exhaust passage means which communicates with the exhaust pipes to receive the exhaust gases. A valve shaft is journaled within the valve body for rotation about an axis that extends transversely across the exhaust passage means. A valve element is affixed to the valve shaft and has spaced portions cooperable with the exhaust passage means for controlling the reflective area for each of the exhaust pipes simultaneously upon rotation of the valve shaft.

DETAILED DESCRIPTION OF THE PREFERRED EMBODIMENTS

Figure 1:
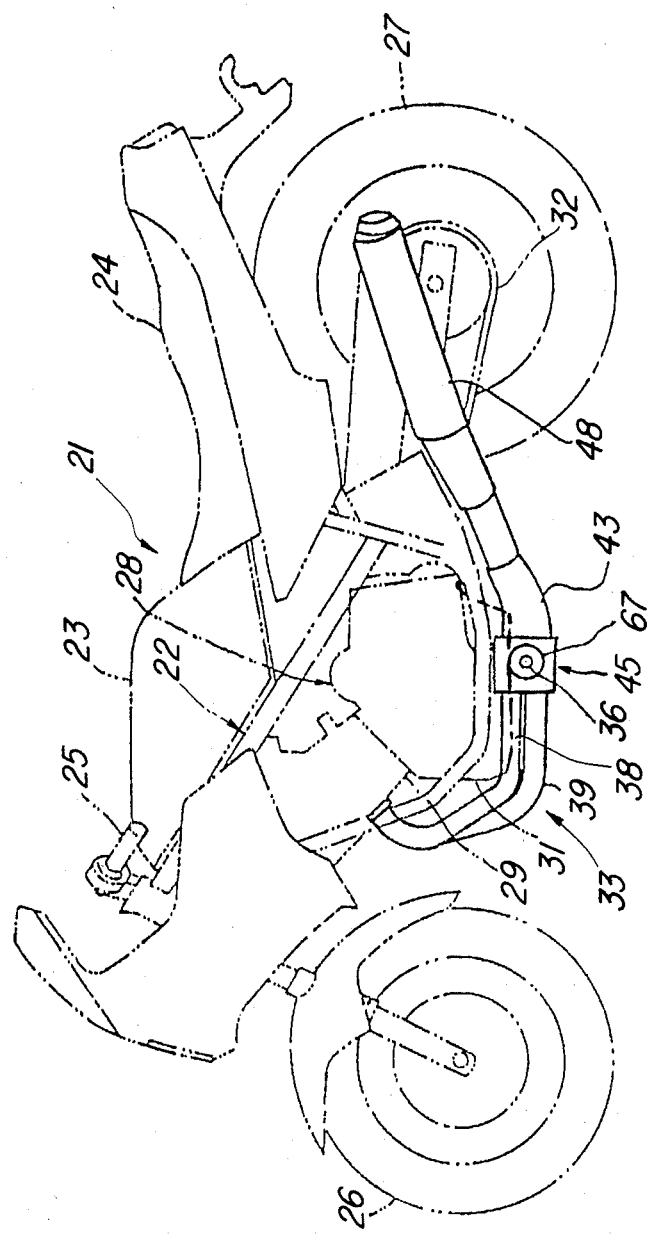
FIG. 1 is a side elevational view of a motorcycle having an exhaust system constructed in accordance with an embodiment of the invention, with portions of the motorcycle other than the exhaust system being shown in phantom.

Referring first in detail to FIG. 1, a motorcycle having an exhaust system constructed in accordance with an embodiment of the invention is identified generally by the reference numeral 21. It is to be understood that a motorcycle is only a typical environment in which the invention may be employed and that the invention has utility in a wide variety of engine application. However, the invention has particularly utility in connection with a motorcycle since such vehicles are extremely compact and readily illustrate the way in which the invention is adapted to such compact vehicles.

Because the motorcycle 21 is depicted for illustrative purposes only, its major components have been shown in phantom and will be described only generally. The motorcycle 21 includes a frame assembly 22 that mounts a fuel tank 23 and seat 24. A handlebar assembly 25 is journaled at the front part of the frame assembly 22 for steering a front wheel 26 that is supported in any known manner. In addition, the frame assembly 22 supports a rear wheel 27 for suspension movement in any known manner.

An internal combustion engine, indicated generally by the reference numeral 28, is supported within the frame assembly 22 beneath the fuel tank 23. The engine 28 includes a cylinder block assembly 29 and a combined crankcase transmission assembly 31. The crankcase transmission assembly 31 affords a means for driving the rear wheel 27, as by means of a driving chain 32.

Figure 2:
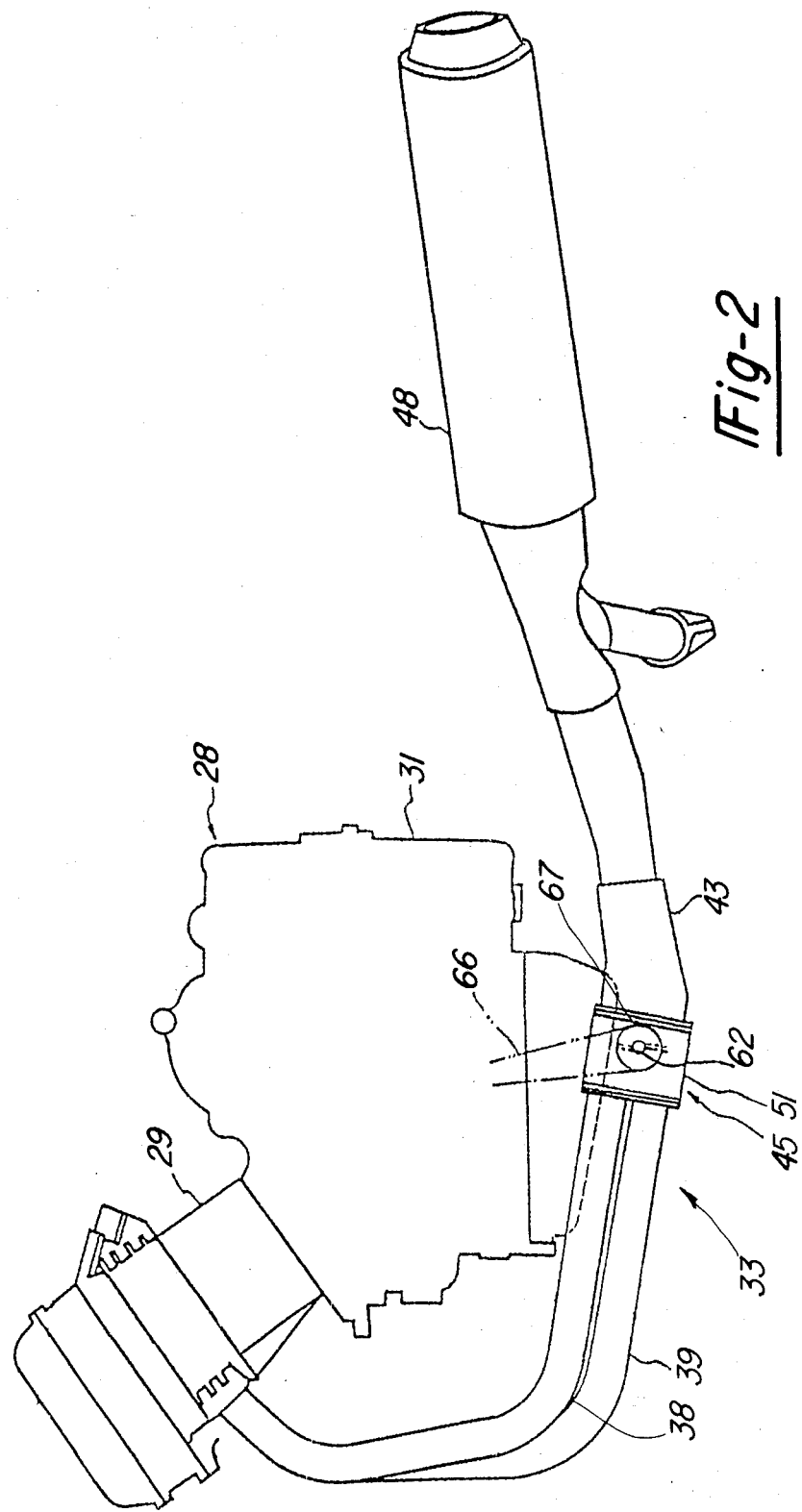
FIG. 2 is a side elevational view, on an enlarged scale, showing the engine and exhaust system.
Figure 3:
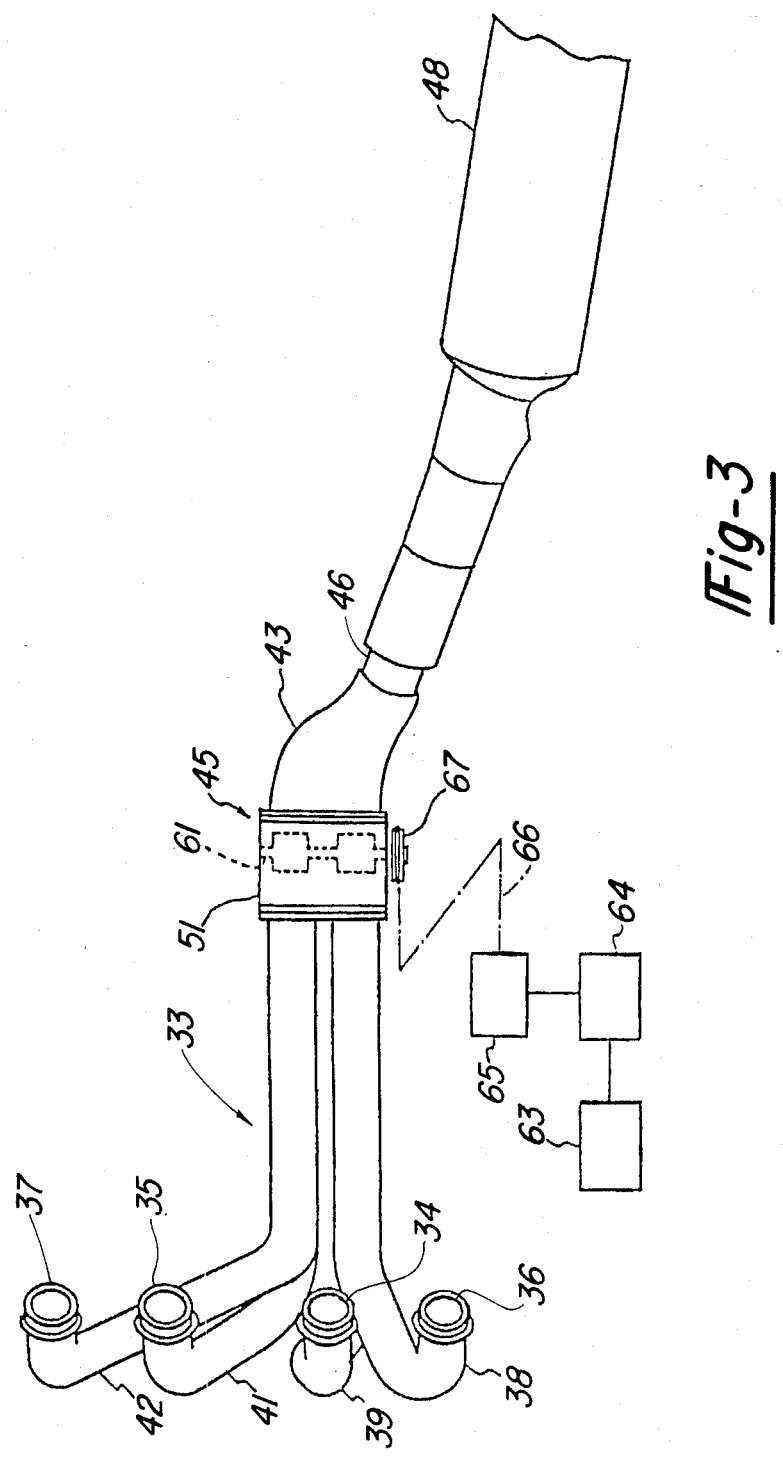
FIG. 3 is an enlarged top plan view showing the exhaust system.
Figure 4:
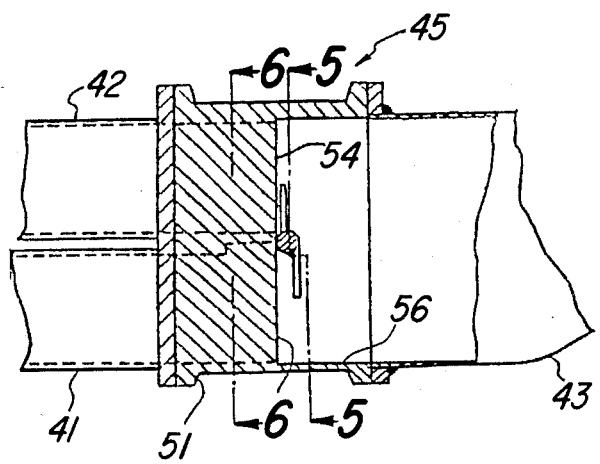
FIG. 4 is an enlarged side elevational view showing the control valve arrangement of this embodiment, with a portion broken away.

The engine 28 is provided with an exhaust system, indicated generally by the reference numeral 33 and which embodies the invention. Referring now to FIGS. 2 and 3, the engine 28 has its cylinder block 29 formed with four cylinder bores that are aligned transversely relative to the motorcycle 21. It is to be understood that the invention may be employed in connection with engines of other cylinder numbers or configurations. However, the invention has particularly utility with engines that have at least two cylinders.

Because of its transverse disposition, the cylinder block 29 has four forwardly facing exhaust ports (not shown). Inlet flanges 34, 35, 36 and 37 of respective exhaust pipes 38, 39, 41 and 42 cooperate with these exhaust ports for receiving the exhaust gases and carrying them downwardly and rearwardly. The exhaust pipes 38, 39, 41 and 42 merge into a collector section 43 which also serve as an expansion chamber. A reflective control valve arrangement, indicated generally by the reference numeral 45, is interposed between the exhaust pipes 38, 39, 41 and 42 and the expansion chamber 43 for a purpose to be described. The valve 45 is nested, in part, in a recess in the crankcase transmission assembly 31 to preserve ground clearance and for compactness. A tail pipe 46 extends rearwardly from the expansion chamber 43 and delivers the exhaust gases to a muffler 48 that lies on one side of the rear wheel 27 for discharge of the exhaust gases to the atmosphere. It should be noted that the exhaust pipes 39 and 41 lie at a slightly lower level than the exhaust pipes 38 and 42 so as to clear the transmission crankcase assembly 31 and to afford a compact nature.

Figure 5:
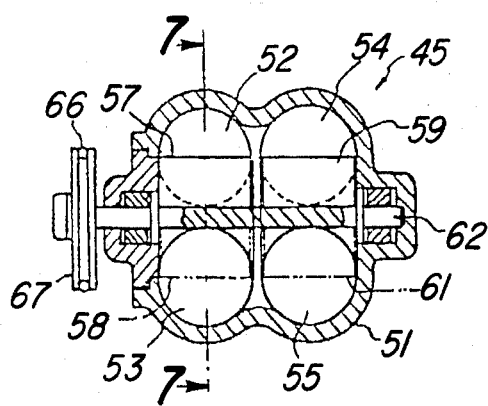
FIG. 5 is a cross-sectional view taken along the line 5—5 of FIG. 4.
Figure 6:
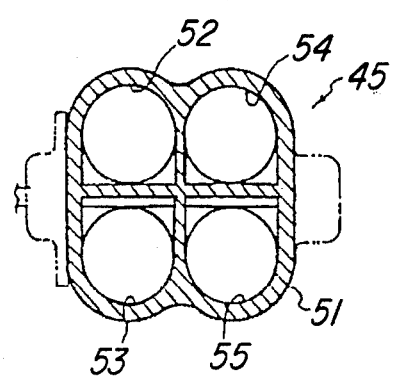
FIG. 6 is a cross-sectional view taken along the line 6—6 of FIG. 4.

The construction and operation of the control valve 45 of this embodiment will now be described by particular reference to FIGS. 4 through 7. The control valve 45 includes a valve body 51 that has a cross-sectional configuration as best shown in FIGS. 5 and 6. The body 51 is formed with four inlet passages 52, 53, 54 and 55 which have a partially cylindrical, partially rectangular cross-sectional configuration as best shown in FIG. 6. These passages 52, 53, 54 and 55 are disposed so as to receive the exhaust gases from the ends of the exhaust pipes 38, 39, 42 and 41, respectively. It should be noted that the passages 52 and 54 and 53 and 55 are in side-by-side relationship and are each disposed in substantially the same horizontal plane. The passages 52 and 54, however, lie above the passages 53 and 55 so as to follow the configuration of the trailing or downstream ends of the respective exhaust pipes 38, 39, 41 and 42. In this way, there will be alignment of the exhaust gas flow into the valve passages 52, 53, 54 and 55.

The trailing ends of the exhaust pipes 38, 39, 41 and 42 are affixed in any suitable manner to the front face of the valve body 51. Thus, there is provided a fluid tight connection in this area.

At the downstream end of the valve body 51, the exhaust gas passages 52, 53, 54 and 55 all merge into a common collector section 56 which, in turn, is in registry at its downstream end with the inlet to the expansion chamber 43. Again, the expansion chamber 43 is affixed to the trailing face of the valve body 51 in any suitable manner so as to provide a fluid tight connection.

In order to control the exhaust gas pulses, there is provided a reflective valve member for controlling the reflective area at the downstream ends of each of the exhaust pipes 38, 39, 41 and 42. In accordance with this embodiment of the invention, this reflective device comprises reflective valve plates 57, 58, 59 and 61 which extend, in their closed positions, along the rectangular portion of the exhaust passages 52, 53, 54 and 55, respectively. The reflective valve plates 57, 58, 59 and 61 are all affixed to a common valve actuating shaft 62 that extends transversely across the mid point of the collector section 56 and which is journaled at its opposite sides in the valve body 51.

Figure 7:
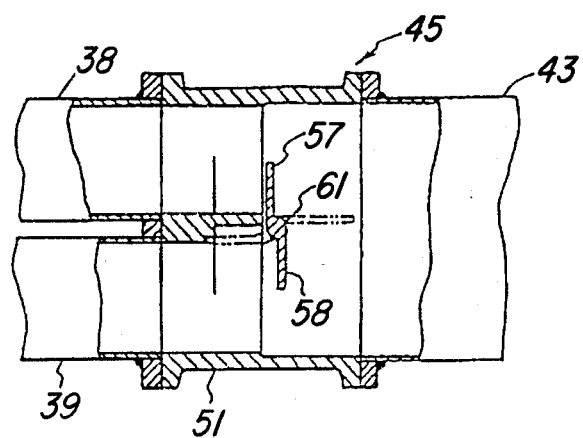
FIG. 7 is a cross-sectional view taken along the line 7—7 of FIG. 5.

As shown in FIG. 7, when the valve shaft 62 is in its closed position, the valve plates 57, 58, 59 and 61 occupy and obstruct approximately one-half of the effective cross-sectional area of the downstream end of the exhaust pipes 38, 39, 41 and 42. However, if the valve shaft 62 is rotated through 90 degrees to the phantom line position shown in FIG. 7, unobstructed flow is achieved. It should be noted that the shape of the valve plates is such that the lowermost valve plates 58 and 61 may pass into the passages 53 and 55 under this condition.

The position of the valve shaft 62 and reflective valve members 57, 58, 59 and 61 is controlled in response to an engine running condition in accordance with the principles set forth in aforenoted copending applications Ser. No. 935,340 and 935,342. To this end, there is provided an engine condition sensing device 63 (FIG. 3) which senses an engine condition such as engine speed. A signal is outputted from the engine condition sensing device 63 to a control device 64 that has a premapped program so as to transmit a signal to a valve actuator 65, which may comprise an electric motor of the stepping type. The valve actuator 65 actuates a flexible transmitter 66 that is connected to a pulley 67 that is affixed to one end of the shaft 62 for rotatably positioning the shaft in accordance with the program mapped into the control unit 64.

Figure 8:
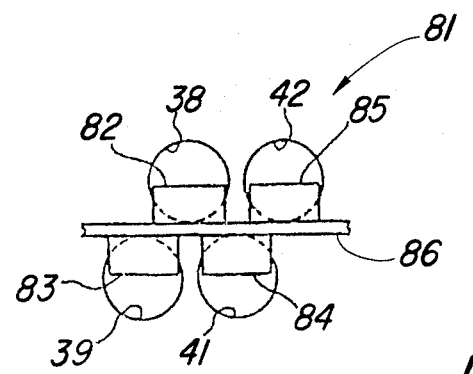
FIG. 8 is a partially schematic front plan view showing the arrangement of the valve elements in another embodiment.

In the embodiment of the invention as thus far described, the ends of the exhaust pipes 38 and 42 lie vertically above the ends of the exhaust pipes 39 and 41, respectively. However, it is to be understood that the arrangement can be employed wherein the exhaust pipes are staggered slightly with respect to each other and FIG. 8 shows such an embodiment. Since this embodiment is substantially the same as the previously described embodiment, only a view corresponding to the view of FIG. 5 is believed to be necessary to understand this embodiment. In this embodiment, the control valve has been indicated generally by the reference numeral 81. The exhaust pipes 38, 39, 41 and 42 are disposed in a staggered relationship as shown in this figure. As a result, the corresponding passages of the control valve are suitably offset and valve members 82, 83, 84 and 85 are provided for controlling the reflective areas at the downstream ends of the exhaust pipes 38, 39, 41 and 42, respectively. The valve members 82, 83, 84 and 85 are all affixed to a common valve shaft 86 for operation in a suitable manner.

Figure 9:
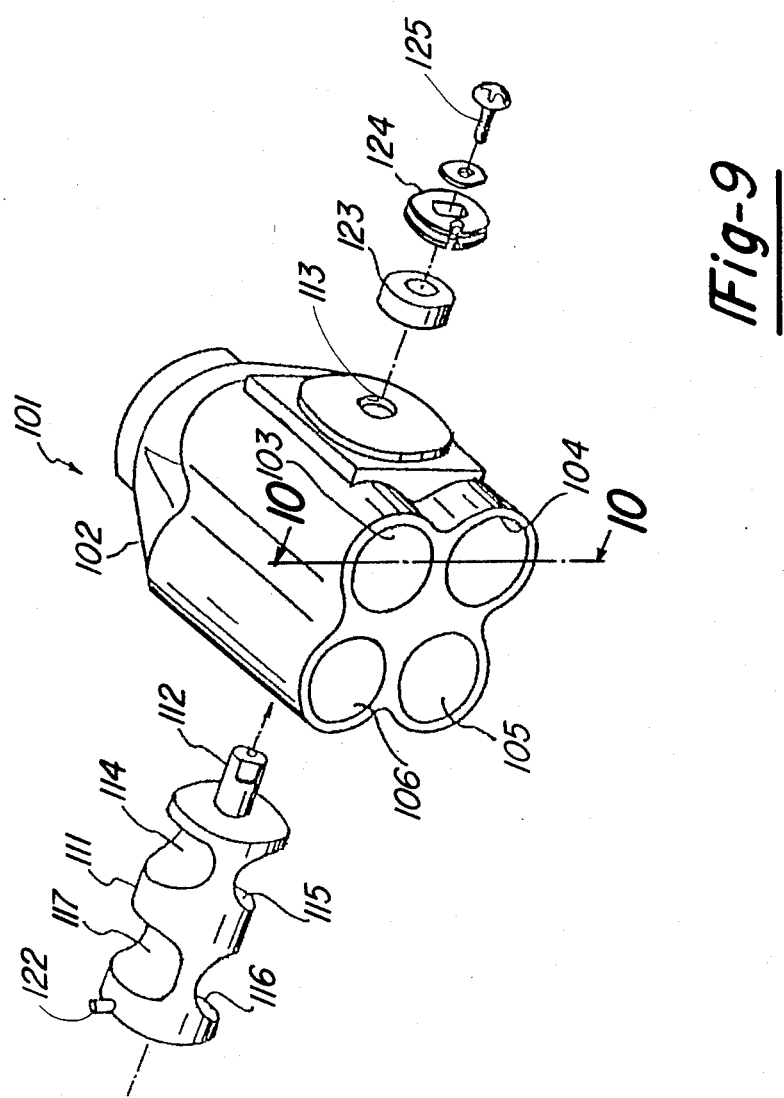
FIG. 9 is an exploded perspective view showing a still further embodiment of the invention.
Figure 10:
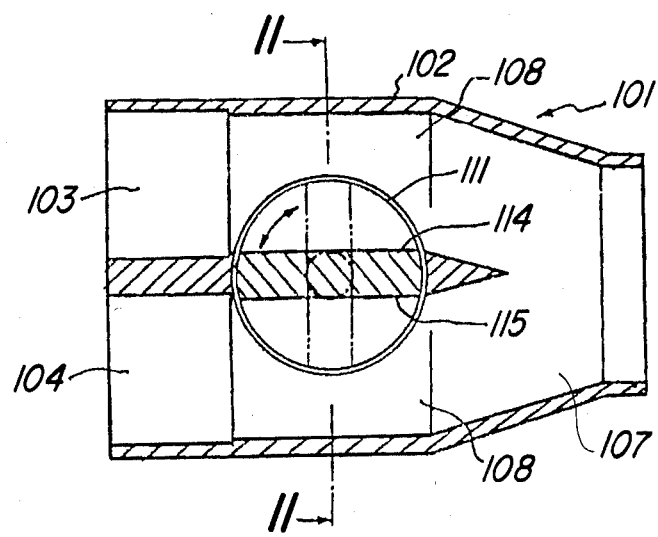
FIG. 10 is a cross-sectional view taken generally along the line 10—10 of FIG. 9.
Figure 11:
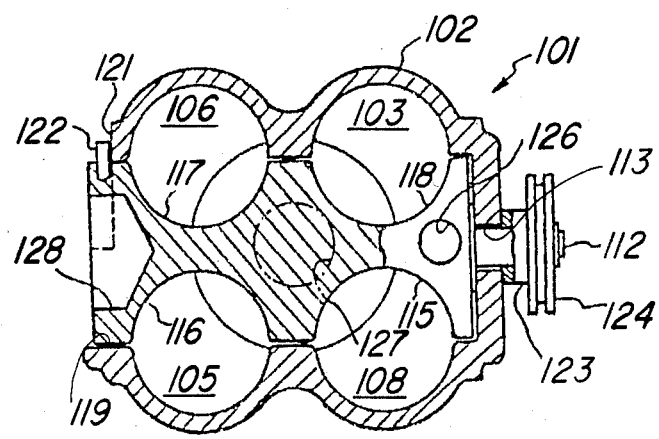
FIG. 11 is a cross-sectional view taken along the line 11—11 of FIG. 10.

A control valve constructed in accordance with yet another embodiment of the invention is identified generally by the reference numeral 101 and is shown in FIGS. 9 through 11. This control valve 101 is adapted for use in an exhaust system of the type as shown in FIGS. 1 through 3 and, therefore, the remaining components of the exhaust system have not been illustrated. The control valve 101 is generally similar to the control valves of the previously described embodiment, however, an improved construction is incorporated for facilitating assembly.

In this embodiment, the control valve 101 includes a main body portion 102 that has a plurality of passages 103, 104, 105 and 106 that are adapted to register with the exhaust pipes 38, 39, 41 and 42, respectively. Again the exhaust pipes 38, 39, 41 and 42 are affixed in a suitable manner to the valve body 102 with these passages in registry. As with the embodiment of FIG. 8, if desired, these passages may be staggered with respect to each other. However, in the illustrated embodiment, the passages are disclosed as being positioned vertically above each other in horizontally aligned pairs.

Downstream of the passages 103, 104, 105 and 106 and approximately at the mid point of the valve body 102, the passages 103, 104, 105 and 106 merge into a common collector section 107. Between the sections 103, 104, 105 and 106 and the section 107, there is provided an area 108 where a rotatable valve member 111 is positioned. The valve member 111 is configured as best shown in FIG. 9 and includes a first shaft portion 112 that is adapted to be journaled in an opening 113 formed in one wall of the valve body 102.

The main portion of the valve 111 has a generally cylindrical configuration with arcuate cutouts 114, 115, 116 and 117 that cooperate with the passages 103, 104, 105 and 106 to provide an open flow area when the valve member is in the opened position as shown in the figures. However, when the valve member is rotated through 90 degrees, a portion of the flow area of the passages 103, 104, 105 and 106 will be obstructed so as to provide a reflective area for the aforedescribed purposes.

To the left of the valve cutout portions 116 and 117 as seen in FIG. 11, the valve body 111 retains its cylindrical shape and is journaled in an opening 119 of a wall 121 of the valve body 102. A pin 122 is staked to this portion so as to axially retain the valve in position and to limit its degree of rotation on both directions. The opposite end of the valve is retained in position by means of a spacer 123 and a pulley 124 that is affixed to the valve shaft portion 112 by means of a threaded fastener 125. As with the previously described embodiments, the pulley 124 is connected by means of a flexible transmitter to an appropriate activating motor for controlling the position of the valve member 111, as aforedescribed.

In order to lighten the weight of the valve member 111, it is provided with a first lightening hole 126 that is juxtaposed to the shaft portion 113. In addition, a pair of lightening holes 127 are drilled into the valve member 111 between the recesses 114 and 115 and the recesses 116 and 117 for the purpose of lightening. Furthermore, a bore 128 or drilled opening is formed at the enlarged end of the valve member 111 for the same purpose. Therefore, even though the valve member 111 is a relatively large element, it will have a low weight.

As should be readily apparent from FIG. 11, the valve assembly may be conveniently disassembled for servicing by removing of the fastener 125 and withdrawing the valve assembly to the left through the large opening 119.

Figure 12:
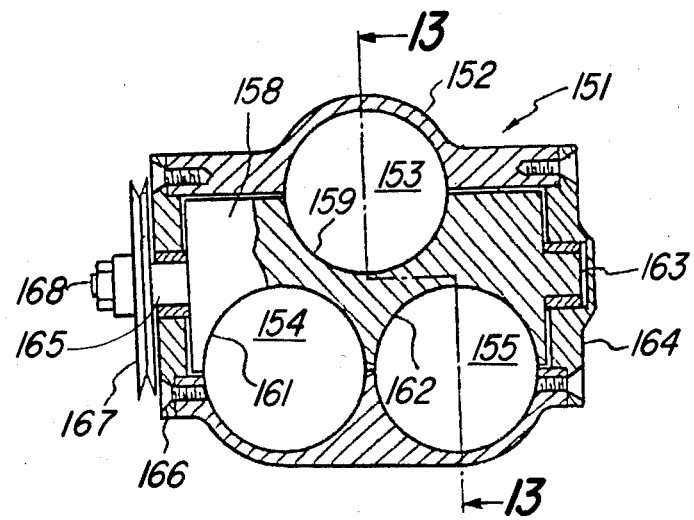
FIG. 12 is a cross-sectional view, in part similar to FIG. 11, showing another embodiment of the invention.
Figure 13:
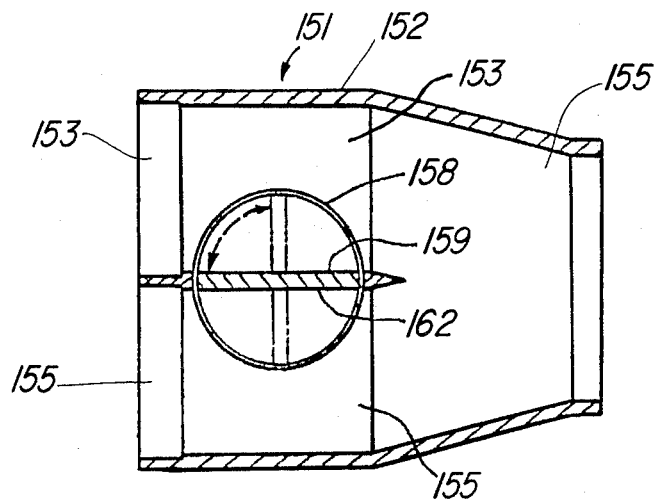
FIG. 13 is a cross-sectional view taken along the line 13—13 of FIG. 12.

In the embodiments of the invention as thus far described, the control valve is operative in a system to control the reflective areas of four exhaust pipes. It should be understood that various changes may be made to accommodate systems having different numbers of exhaust pipes and FIGS. 12 and 13 show an embodiment of a control valve, indicated generally by the reference numeral 151, which is adapted to control the flow and reflective area of systems having three exhaust pipes. In this embodiment, the control valve 151 has a valve body 152 that is formed with three inlet passages 153, 154 and 155. In this embodiment, the passage 153 lies above the passages 154 and 155 and is disposed midway between them. Of course, other geometric arrangements are possible as should be readily apparent to those skilled in the art.

A collector section 155 is provided downstream in the valve body 152 and is adapted to cooperate with a suitable collector expansion section, as with the previously described embodiments.

Within inlet openings 153, 154 and 155 of the valve body 152, a rotatable valve element, indicated generally by the reference numeral 158, is journaled. The valve element 158 has a generally cylindrical body portion that is provided with recesses 159, 161 and 162 that cooperate with the passages 153, 154 and 155 for controlling their effective reflective area, as aforedescribed.

In this embodiment, one portion of the cylindrical valve member is formed with a reduced diameter shaft portion 163 that is journaled in a cover plate 164 that is affixed to one side of the valve body 152. The opposite end is also provided with a reduced diameter shaft portion 165 that is journaled in a second cover plate 166 that is fixed to the opposing side of the valve body. This shaft portion 165 extends outwardly and has affixed to it a pulley 167 by means of a nut 168 so as to rotatably couple the pulley 167 to the valve member 152. As with the previously described embodiments, the valve member 152 is rotatably positioned by an appropriate control mechanism, for example, one of the types shown in FIGS. 1 through 7.

It should be readily apparent that each of the described constructions permits the use of a valve member that is adapted to control the flow through a plurality of passages. However, the valve member can be maintained extremely short in length because of the construction of the valve and hence problems associated with thermal expansion will be avoided. In the illustrated embodiments, the valve member controls the flow into a single expansion chamber. It is to be understood, however, that the valve member may control the flow into a plurality of expansion chambers and that various other changes and modifications may be made without departing from the spirit and scope of the invention, as defined by the appended claims.

What is claimed is:

1. A valve for controlling the flow of exhaust gases simultaneously through a plurality of exhaust pipes comprising a valve body adapted to be affixed to said exhaust pipes for receiving exhaust gases therefrom, exhaust passage means formed in said valve body comprising a plurality of discrete exhaust passages each communicating with a respective exhaust pipe for receiving exhaust gases therefrom, said passage being placed in horizontally extending rows with some above the others, a valve shaft journaled in said valve body for rotation about an axis that extends transversely across said exhaust passage means and a valve element affixed to said valve shaft and having spaced portions cooperable with said exhaust passage means for controlling the reflective area for each of said exhaust pipes simultaneously upon rotation of said valve shaft.

2. A valve as set forth in claim 1 wherein the discrete exhaust passages are vertically aligned.

3. A valve as set forth in claim 1 wherein the exhaust passages are vertically staggered.

4. A valve as set forth in claim 1 wherein the valve element portions are all formed on a common member.

5. A valve as set forth in claim 1 wherein the valve element portions are formed by separate valve elements all fixed for rotation to a common shaft.

6. A valve as set forth in claim 1 in combination with a plurality of exhaust pipes extending from an internal combustion engine and further including an expansion chamber positioned downstream of said valve body and receiving the exhaust gases from the exhaust passage means.

7. A valve as set forth in claim 6 wherein the discrete exhaust passages are vertically aligned.

8. A valve as set forth in claim 6 wherein the exhaust passages are vertically staggered.

9. A valve as set forth in claim 6 wherein the valve element portions are all formed on a common member.

10. A valve as set forth in claim 6 wherein the valve element portions are formed by separate valve elements all fixed for rotation to a common shaft.

11. In a motorcycle having a frame, a seat carried by said frame and adapted to carry a single rider seated in straddle fashion, a single dirigible front wheel and a single rear wheel, and an engine having a combined crankcase transmission assembly carried by said frame for driving said rear wheel, said engine having at least four exhaust ports, the improvement comprising a at least four exhaust pipes each extending from a respective exhaust port downwardly and passing beneath said engine crankcase transmission assembly and rearwardly relative thereto, said exhaust pipes being aligned in vertically spaced planes in an area beneath said crankcase transmission assembly with the uppermost exhaust pipes passing through a recess in said crankcase transmission assembly for maintaining ground clearance and minimizing the width occupied by said exhaust system, and a valve for controlling the flow through said exhaust pipes, said valve being disposed beneath said crankcase transmission assembly.

12. In a vehicle as set forth in claim 11 wherein the exhaust pipes are transversely aligned with each other.

13. In a vehicle as set forth in claim 11 wherein the exhaust pipes are staggered transversely relative to each other.

* * * * *